United States Patent [19]
Aaron

[11] Patent Number: 5,745,030
[45] Date of Patent: Apr. 28, 1998

[54] AUTOMATIC OCCUPANT SENSING ANTI-CARJACKING SYSTEM

[76] Inventor: Albert Aaron, P.O. Box 5298, Detroit, Mich. 48205

[21] Appl. No.: 618,832

[22] Filed: May 14, 1996

[51] Int. Cl.$^6$ .................................................. B60R 25/10
[52] U.S. Cl. ...................... 340/426; 340/428; 307/10.2; 280/287
[58] Field of Search .................... 340/425.5, 426, 340/428, 429; 307/10.2–10.7; 180/271, 287

[56] References Cited

U.S. PATENT DOCUMENTS

| | | | |
|---|---|---|---|
| 3,656,100 | 4/1972 | Beltrami | 340/566 |
| 3,665,386 | 5/1972 | Dosch | 340/53 |
| 3,815,089 | 6/1974 | Beltrami | 340/64 |
| 3,975,645 | 8/1976 | Morar | 340/426 |
| 4,180,796 | 12/1979 | Palafox | 340/426 |
| 4,371,052 | 2/1983 | Brandt | 180/287 |
| 4,792,792 | 12/1988 | Costino | 340/426 |
| 4,975,678 | 12/1990 | Hwang | 340/426 |
| 5,264,852 | 11/1993 | Schneider | 340/426 |
| 5,298,878 | 3/1994 | Smith | 340/426 |
| 5,307,048 | 4/1994 | Sonders | 340/426 |
| 5,318,147 | 6/1994 | Maiefski | 180/287 |
| 5,382,948 | 1/1995 | Richmond | 340/825.36 |
| 5,401,924 | 3/1995 | Armanno, Sr. | 200/244 |
| 5,424,712 | 6/1995 | Rosenberger | 340/426 |
| 5,438,311 | 8/1995 | Lane, Sr. | 340/426 |
| 5,453,730 | 9/1995 | De-Grinis et al. | 340/426 |

*Primary Examiner*—Jeffery Hofsass
*Assistant Examiner*—Daniel J. Wu

[57] ABSTRACT

A vehicular automatic occupant sensing anti-carjacking system primarily designed to automatically and continuously protect a vehicle from carjacking and to provide preventive protection to the authorized occupant of the vehicle from being taken hostage in their own vehicle and to facilitate the recovery of a vehicle during a carjacking regardless, whether the vehicle is occupied or unoccupied, regardless, whether the vehicle is attended or unattended, regardless, whether the ignition is on or off and regardless, whether the engine is running or not running. The system includes an electronic Command Control Unit which communicates with a plurality of sensors to provide the necessary input signals to the command control unit. The system has a means for automatically monitoring and determining the occupancy status of the vehicle via pre-programed occupancy status instructions. If the occupancy status of the vehicle deviates materially from the pre-programed occupancy status, at any time, vehicle disabling means and alarm means are automatically actuated. Also included in the system are means for automatically disabling the vehicle, as well as, automatically enabling the system to facilitate use of the vehicle by the authorized occupant. Once programed, the system operates automatically requiring no manually operable activation of any hidden switches, remote signalling devices, buttons or other manually operated actuators.

2 Claims, 5 Drawing Sheets

FRONT 5,745,030

AUTOMATIC OCCUPANT SENSING ANTI-CARJACKING SYSTEM

CROSS REFERENCE

1. Field of the Invention

The present invention relates in general to vehicle security systems. More specifically the invention relates to a computerized, electronic and mechanical system for protecting a vehicle from carjacking and to prevent the authorized operator from being taken hostage in their own vehicle regardless whether the vehicle is attended, unattended, occupied, unoccupied and regardless whether the vehicle's engine is running or not running, and regardless whether the ignition is on or off.

2. Description of Related Art

The definition for carjacking is simply the taking of a vehicle from the authorized occupant by an unauthorized occupant who by force or coercion obtains the keys and attempts to possess or possesses the vehicle of the authorized occupant. Some carjackings involve hostages, but more definitively, it is where an unauthorized occupant forcibly seizes or commandeers the vehicle while taking the authorized occupant hostage during the carjacking.

Carjackings take on many scenarios, such as, confronting the authorized occupant before entering the vehicle or shortly after exiting the vehicle, confronting the authorized occupant at a stop light or other stopping situation and taking the authorized occupant hostage during the carjacking. These are just some of the many scenarios the carjacker uses.

The carjacker, usually, by force, coercion and intimidation obtains possession of the vehicle keys from the authorized occupant at which point the carjacker makes an easy getaway. The prime directive of the carjacker is to possess the keys to a carjacked vehicle for a quick and easy getaway. As an example, an authorized occupant is confronted by a carjacker as they approach their parked vehicle, the carjacker demands the authorized occupant's keys, before the authorized occupant enters the vehicle, at gunpoint, and makes an easy getaway. A carjacker may attempt to take an authorized occupant hostage in their own vehicle and force them to drive or the carjacker may force the authorized occupant into the trunk of their own vehicle.

Carjacking has become a very popular crime among the criminal element because there is no need for technical knowledge, such as, hotwiring the vehicle's ignition or manipulating the steering column to obtain the vehicle, they need only a weapon, such as a gun, to coerce and intimidate the authorized occupant of the vehicle to relinquish control of the vehicle keys. Many attempts have been made to provide vehicle security systems to protect against carjackings. No present vehicle security systems have been made to provide full preventive protection against a multitude of different carjacking scenarios. Further, many systems which have attempted to provide an effective anti-carjacking system include drawbacks and disadvantages.

A first group of security systems attempt to solve the carjacking problem by using hidden switches to disable the vehicle and tear gas and other disabling fluids to disable the carjacker. Others use radio transmitters and door sensors which will disable the vehicle after a period of time after pressing a button on a remote radio transmitter or opening of a door. However, none of these systems provide adequate protection against the initial act of carjacking when the authorized occupant is not in the vehicle and the vehicle ignition is not on.

For example, U.S. Pat. No. 5,401,924 issued on 28 Mar., 1995 to Frank Armanno, Sr. discloses a remote battery switch for motor vehicles provides for the remotely controlled disconnection and connection of the vehicle electrical system, for long term storage or carjacking threats. One disadvantage in Armanno is that on late model vehicles with computer controlled systems it would not be advisable to disconnect the vehicle battery for even short intervals of time. On computer controlled systems volatile memory and data may be lost as well as clock and timer settings and other settings which depend on a constant 12 volt battery supply. Another disadvantage in Armanno is that it does not offer automatic operation of its anti-carjacking functions. In Armanno, the cord or cable must be manually operated. Thus, many carjacking attempts will still be successful where the operator may forget to activate the device or the carjacker has the element of surprise and prevents the operator from activating the device.

U.S. Pat. No. 5,424,712 issued on 13 Jun., 1995 to Ronald J. Rosenberger discloses a motor vehicle carjacking defense apparatus comprising a double pole switch which actuates at least one valve which interconnects a nozzle to a pump connected to a pressurized tank containing a non-toxic and non-corrosive irritant. One disadvantage in Rosenberger is the use of irritants and smoke. Another disadvantage is that the operator must be inside the vehicle in order to activate the carjacking defense functions and the carjacker must be on the outside of the vehicle. Thus many carjacking attempts will still be successful where the operator is not in the vehicle during the carjacking or where the carjacker enters the vehicle prior to the activation of the hidden switch.

Another anti-carjacking device is disclosed in U.S. Pat. No. 5,438,411 issued on 1 Aug., 1995 to Donald W. Lane, Sr. It discloses an anti-carjacking circuit for disabling a motor vehicle after the driver of the vehicle has been unwillingly forced to exit the vehicle. A disadvantage in Lane, Sr. is that it offers no protection to the driver who is outside of the vehicle when the carjacking occurs. Another disadvantage in Lane, Sr. is that it requires a hidden switch which must be manually operated by the driver. Thus many carjackings will still be successful where the driver forgets to fasten the seatbelt or where the driver is carjacked prior to entering or just exiting the vehicle.

Another example, U.S. Pat. No. 3,665,386 issued on 23 May, 1972 to Thomas J. Dosch discloses a system where an anti-hijack system carried by a vehicle includes a means for monitoring the route being travelled by the vehicle and means for continuously comparing the travelled route with the stored pre-programed route. This system would require the driver to drive a programed route without possible deviation for traffic conditions which would be inefficient and costly.

Other attempted solutions are disclosed under U.S. Pat. No. 5,298,878 issued on 29 Mar., 1994 to Lorenzo L. Smith and U.S. Pat. No. 5,318,147 issued on 7 Jun., 1994 to Romaine R. Maiefski. In Smith, a hidden foot switch is used to disable the ignition and activate tear gas distribution into the passenger compartment of the vehicle. Of course, this arrangement has many disadvantages. It is not feasible for use in any situation except where the operator is forcibly removed from the vehicle while the engine is running. Additionally, accidental distribution of the tear gas into the passenger compartment can be dangerous to the operator or its passengers. Such a system offers no protection if the operator is not in the vehicle and the engine is not running. A disadvantage in Maiefski, is that the operator must be inside the vehicle to activate the anti-carjacking feature. Just as in Smith, Maiefski's device offers no protection against carjackings where the operator is approached by a carjacker prior to entering the vehicle. In this situation the carjacker obtains the operators keys and makes an easy getaway before the operator enters the vehicle.

Others like U.S. Pat. No. 5,307,048 issued on 26 Apr., 1994 to David G. Sonders discloses a anti-carjacking feature which is automatically initiated by the starting of the engine. A second disablement sequence is initiated by the sensing of a door opening while the engine is running or upon receipt of a signal transmitted by remote control transmitter. A major disadvantage of the Sonders system is that if the carjacker gets the keys and the remote transmitter or disables the operator so they cannot activate the remote before they start the vehicle engine or during the carjacking event the carjacker can still make an easy getaway. Another disadvantage in Sonders is that its anti-carjacking feature is only active while the vehicle engine is running. It offers no protection when engine is not running.

Another U.S. Pat. No. 5,382,948 issued on 17 Jan., 1995 to Henry Richmond discloses an anti-carjacking feature which may be remotely initiated by the vehicle operator who has been forcibly removed from the vehicle or passively initiated and include locking the vehicle doors, closing the vehicle windows, and thereafter disabling the engine to confine a criminal carjacking perpetrator within the vehicle to wait apprehension by law enforcement authorities. One disadvantage in Richmond is that it offers no anti-carjacking protection when the vehicle engine is not running. Additionally, in Richmond another disadvantage is that the anti-carjacking feature must be remotely initiated. Thus, many carjackings attempts will be successful in situations where the owner cannot use the remote control device, i.e., taken by the carjacker or left at home.

Use of a timer is disclosed in U.S. Pat. No. 3,815,089 issued on 4 Jun., 1974 to Joseph P. Beltrami. In Beltrami a vehicle alarm circuit may be activated only for a period of time, the duration of which interval cannot be shortened once selected. A disadvantage of the timer is that it is non-reversible. This would prevent instantaneous resetting of the feature after disablement. Additionally, the hijacker may wait out the timer period and restart the engine. Thus, Beltrami does not provide a system which can automatically enable the system for an authorized occupant.

The present invention anticipates a new and improved vehicle security system which overcomes these problems by providing an unmatched anti-carjacking system.

SUMMARY

Briefly, the present invention incorporates a vehicular automatic occupant sensing anti-carjacking system wherein an electronic command control unit is mounted within a vehicle and provides automatic and continuous anti-carjacking functions designed to automatically disable and enable the vehicle during a carjacking attempt scenario. An array of strategically placed sensors are continuously monitored and provide the command control unit with continuous information on vehicle occupancy and other vehicle conditions.

Since the present invention works automatically, there is no need for the authorized occupant to carry a remote transmitter or manually activate any hidden switches or buttons or other controls to activate its anti-carjacking functions. The present invention renders the keys useless to the carjacker as vehicle systems will automatically be disabled notwithstanding the carjackers possession of the vehicle keys as array of sensors not the keys determine whether or not the vehicle will be disabled or enabled.

In the event the authorized occupant of the vehicle is forcibly removed from the vehicle, by an unauthorized occupant who then commandeers the vehicle, the command control unit, which is programmed to interact with a strategically placed array of sensors positioned within the vehicle, will take the appropriate responsive action. The command control unit will initiate a disablement sequence that will disable the vehicle's ignition, fuel, and starting systems, as well as, activate internal and external audible devices to compel the unauthorized occupant away from the vehicle immediately after disablement.

In the event the carjacker attempts to enter the vehicle and take the authorized occupant hostage and attempts to force the authorized occupant to drive the vehicle at gunpoint the array of sensors will communicate to the command control unit an unauthorized occupancy has occurred and the disablement sequence, as described above, will be automatically initiated by the command control unit.

In the event the authorized occupant is forcibly removed from the vehicle and taken hostage by the carjacker who then forces the authorized occupant into the trunk and possesses the vehicle in an attempted getaway. The array of sensors will communicate to the command control unit an unauthorized occupancy of the vehicle has occurred and the disablement sequence, as described above, will be automatically initiated by the command control unit.

It is also an object of the present invention to eliminate the act of carjacking as a crime of choice for carjackers and the like.

It is another object of the present invention to be well known and visible to the public through advertisement and by identification of vehicles so equipped so that carjackers will clearly see that vehicles are so equipped.

It is yet another object of the present invention to provide a vehicular automatic occupant sensing anti-carjacking system which uses a continuously monitored array of sensors installed in strategic locations throughout the vehicle that communicate the occupancy status of the vehicle to the command control unit which will initiate the appropriate response.

Yet another object of the present invention is to provide a vehicular automatic occupant sensing anti-carjacking system that is designed to provide a safe, quick, easy and reliable system which permits an authorized occupant to operate the vehicle while making it virtually impossible for an unauthorized occupant to operate the vehicle.

It is yet another object of the present invention to provide a vehicular automatic occupant sensing anti-carjacking system that provides effective anti-carjacking protection under all vehicles conditions, that is, this vehicular automatic occupant sensing anti-carjacking system will provide and operate effective anti-carjacking protection regardless whether the engine is running or not running, regardless whether the ignition is on or off, regardless whether the vehicle is attended or unattended, and regardless whether the vehicle is occupied or unoccupied or any combination of the above conditions.

A yet still further object of the present invention is to render the keys useless to the carjacker as vehicle systems enablement is controlled by the array of sensors which communicate with command control unit and not the keys.

Yet another object of the invention is to provide a means for programming the system which consists of a keypad with the necessary functions combined with an LCD or liquid crystal diode to read input and output from the command control unit and to allow for quick and easy programming by the authorized occupant.

A still further object of the present invention is to provide the system with a removable keyboard and monitor which need not be installed in the vehicle in order for the present invention to provide its unmatched anti-carjacking functions.

Yet another object of the present invention is to provide each unit of the invention with a three to seven digit alpha-numeric program identification number to prevent unauthorized programming and to allow for changing the program identification number at the request of the authorized operator.

An additional object of the invention is to provide each unit of the invention with a unique wiring color code to prevent systematic tampering.

Yet another object of the present invention is to provide each unit with self diagnostic capabilities to provide on board diagnostics for quick and effective repairs and maintenance.

Still another object of the present invention is to provide a vehicular automatic occupant sensing anti-carjacking system of the general character described which is capable of providing appropriate responses to all carjacking situations and scenarios.

With these objectives in view, it should be understood that it is an object of the present invention to provide a vehicular automatic occupant sensing anti-carjacking system which provides unequalled anti-carjacking features which are not subject to the limitations and disadvantages of the related history aforementioned.

It is the object of the present invention to provide improved elements and arrangements there of in an apparatus for the purposes described which is inexpensive, durable dependable, and fully effective in accomplishing its intended objectives.

These and other objects of the present invention will become readily apparent upon further review of the following specifications and drawings and of the following detailed description of the preferred embodiment thereof.

DESCRIPTION OF THE PREFERRED EMBODIMENTS

Figure 1:
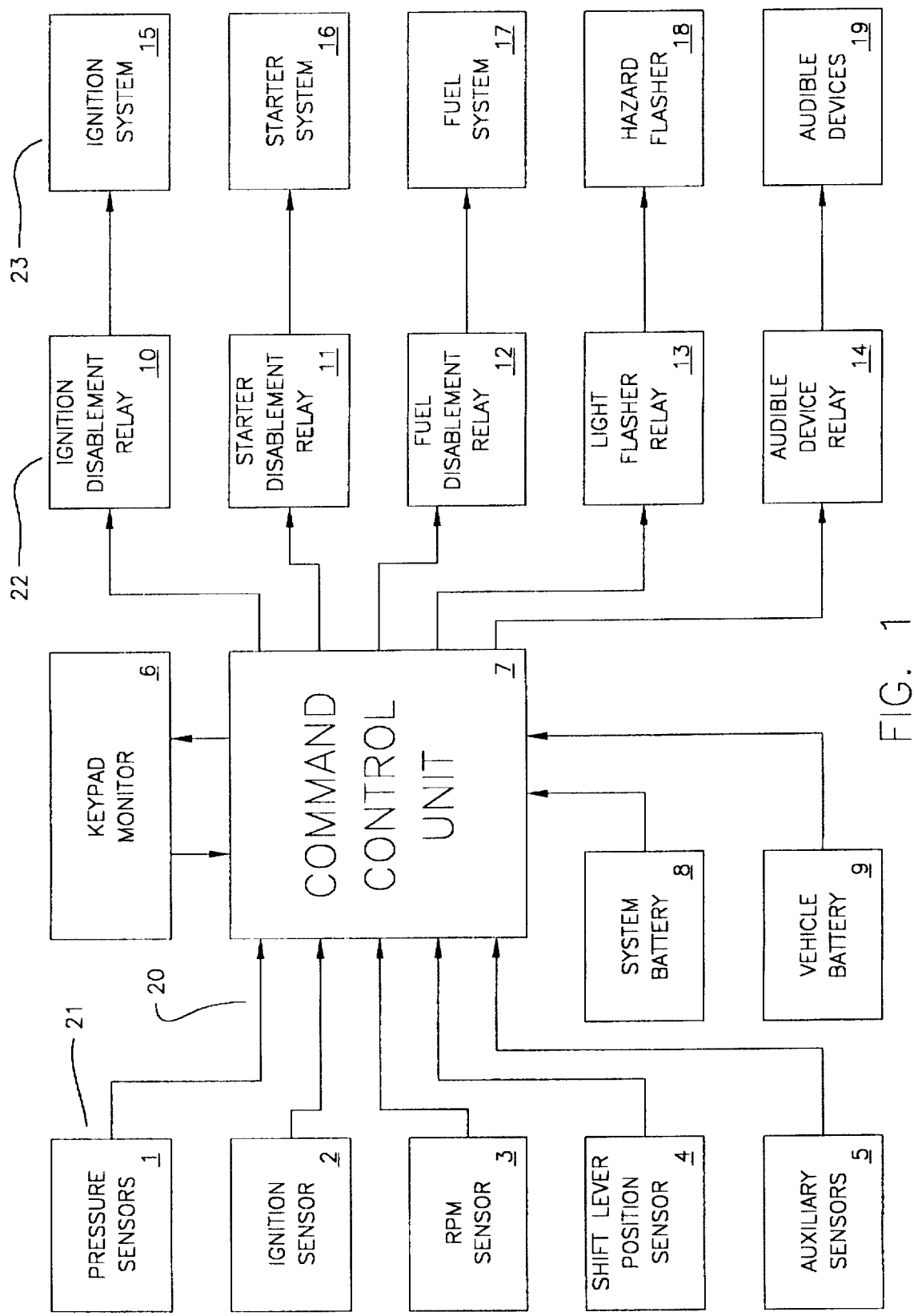
FIG. 1 Is a block diagram of a automatic occupant sensing anti-carjacking system according to the present invention.

Referring now in detail to the drawings, more specifically FIG. 1, the reference numeral 20 denotes generally a vehicular automatic occupant sensing anti-carjacking system constructed in accordance and embodying the invention. The automatic occupant sensing anti-carjacking system 20 contains an electronic command control unit 7, mounted in a hidden location within a motor vehicle 64, in FIG. 5. The command control unit 7 is configured for communication with an array of sensors 21.

As will be observed from FIG. 1, the command control unit 7 is operatively connected to a combination keypad-monitor 6 for user programming including bypass and override functions. Such programming may include a selection of available options such as, sensor selections, audible warning devices, timers, light flashers etc. An array of sensors 21 are operatively connected to a command control unit 7. The sensors may include pressure sensors, infra red sensors, motion detectors, ignition sensors, shift lever position sensor, RPM sensors etc. These are all conventional sensors which are used in conjunction with other existing vehicular protection systems and are well known in the market.

Selected system carjacking responses are actuated by signal from the command control unit 7 to an array of interfaced relays 22. The relays 22 are strategically positioned at various locations throughout the vehicle 64 and with each adapted to serve a dedicated function. Among the relays 22 are an ignition disable relay 10, starter disable relay 11, fuel disable relay 12, audible device relay 14, lighting relay 13.

Internal and external audible devices 19 are operatively connected to the audible device relay 14 within the vehicle 64 for the purposes of providing internal audible functions to drive the carjacker out of the vehicle 64, as well as, external audible functions to provide an audible alert to draw attention to the vehicle 64 and the carjacker.

The combination keypad-monitor 6 may be employed to program the command control unit 7 to recognize only certain of the sensors 21 and which of the relays 22 will be actuated under specific circumstances and in which sequence the relays 22 will be activated. For example, the authorized occupant can program the operator's seat pressure sensor 61, referring to FIG. 5, this sensor 61 employs a low cost versatile pressure transducer 43 which will allow the authorized occupant to program a specific voltage signal to the command control unit 7. Any of the pressure actuated sensors 1 may be variable, sensor 61 was chosen for simplicity. The voltage signal will be relative to the amount of pressure that the authorized occupant exerts on the sensor 61 while sitting in the authorized occupant's seat 56. This will allow an authorized operator to program a specific voltage signal from sensor 61 in the memory of the command control unit 7 allowing only an authorized occupant to operate the vehicle 64 within the parameters stored in the memory of the command control unit 7.

The keypad-monitor 6 may also provide on screen verification of all programming activities through its liquid crystal diode monitor and keypad. Additionally, the keypad-monitor 6 may be employed to program the command control unit 7 to appropriately adjust sensitivity of sensors 21, as well as, appropriately actuating the relays 22.

The automatic occupant sensing anti-carjacking system 20 includes an ignition sensor 2 which determines when ignition is on as an additional input to command control unit 7. Ignition sensor 2 is preferably a wire connected to the vehicle 64's ignition circuit (not shown) for producing a voltage signal when the ignition is on and no voltage signal when the ignition is off. The automatic occupant sensing anti-carjacking system 20 also includes an engine RPM or revolutions per minute sensor 3 which determines when the engine is running as an additional input to the command control unit 7. RPM sensor 3 is preferably a wire connected to the vehicle 64's ignition circuit (not shown) for providing a voltage signal when the engine is running and for providing no voltage signal when the engine is not running.

The automatic occupant sensing anti-carjacking system 20 also includes an shift lever position sensor 4 which determines what position the vehicle 64's shift lever (not shown) is in as an additional input to the command control unit 7. Shift lever position sensor 4 is preferably a wire connected to the vehicle 64's neutral safety switch (not shown) for providing a voltage signal when the shift lever (not shown) is in the reverse or any forward drive selection e.g. first, second, third and overdrive on equipped automatic transmissions and for providing no voltage when the shift lever is in the neutral or park position.

In vehicle 64's with manual transmissions a clutch pedal sensor (not shown) is used to signal the command control unit 7 of vehicle 64 movement. However, other sensing devices for determining whether the vehicle 64 is in neutral, drive, or reverse or whether the vehicle 64 is moving or not moving would be realized by one having ordinary skill in the art as providing the same purpose. Auxiliary sensors 5 such as, motion sensors, infra red sensors, and pressure sensors may also be used.

Figure 4:
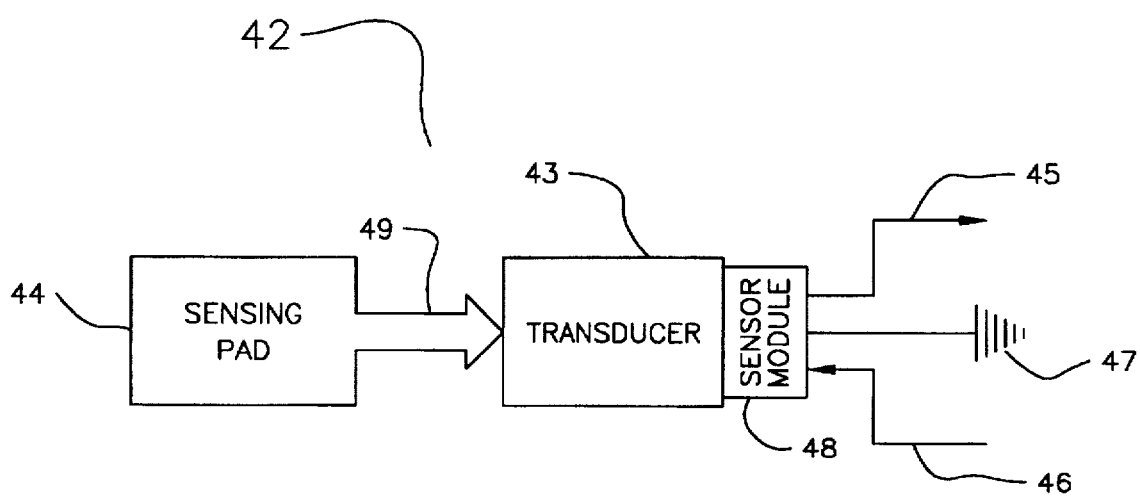
FIG. 4 Is a schematic block diagram of a variable signal pressure sensor.
Figure 5:
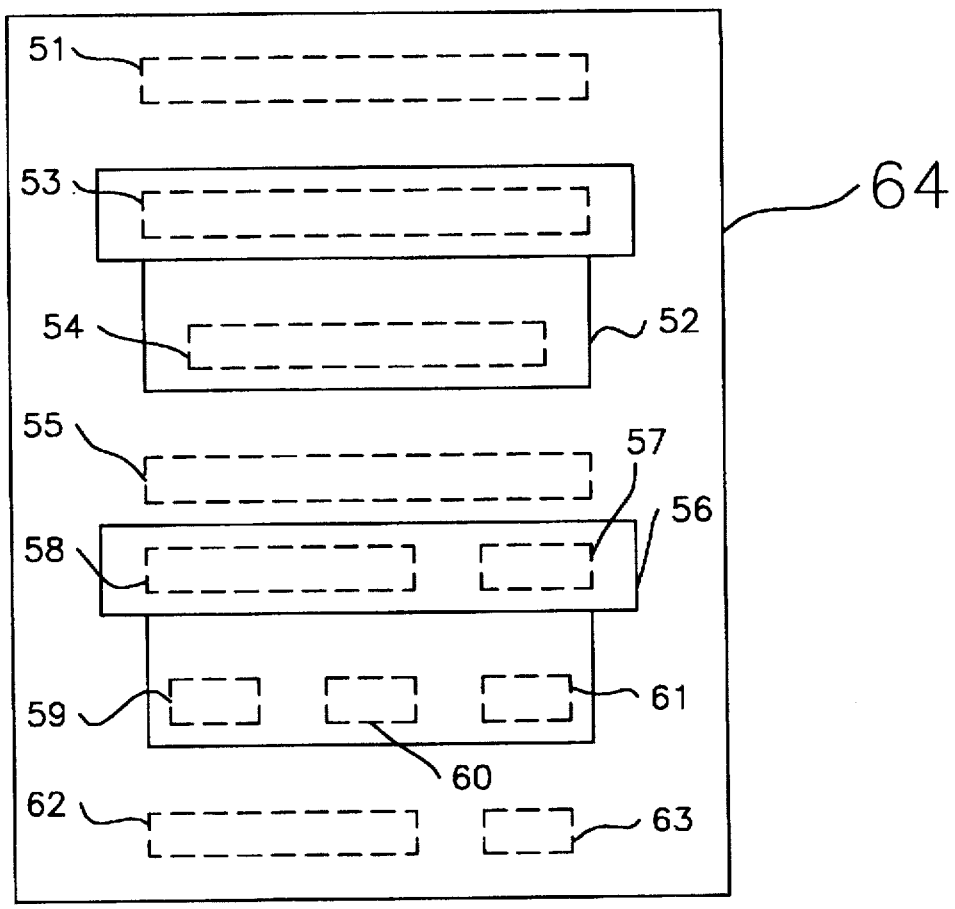
FIG. 5 Is a top view of schematic block diagram of a automatic occupant sensing anti-carjacking system installed in a vehicle according to the present invention.

The automatic occupant sensing anti-carjacking system also includes pressure sensors 1 used to determine if a seat or other monitored area inside vehicle 64 is occupied or unoccupied as an additional input to the command control unit 7. Thus this is what is referred to as the occupant sensing aspect of the present invention. These sensors 1 which are pressure sensitive and are strategically located in the interior seating and floor area of the vehicle 64. Referring to FIG. 5, which is a top view of a block diagram of vehicle 64 shows one of many possible, strategic installations of pressure sensors. The reference numerals 51, 55, 62 and 63 denote fixed signal pressure sensors which detect pressure on the floor area of the vehicle 64. Sensor 51 is located in the floor of the rear cargo or trunk area. Sensor 55 is located in the floor area of the rear seats. Sensors 62 and 63 are located in the floor area of the front seats. The reference numeral 52 denotes the rear seat of vehicle 64. The reference numeral 53 denotes a fixed signal pressure sensor located in the backrest cushion of the rear seat 52 of vehicle 64. The reference numeral 54 denotes a fixed signal pressure sensor located in the seat cushion of the rear seat 52 of vehicle 64. The reference numeral 56 denotes the front seat of vehicle 64. The reference numerals 57 and 58 denote fixed signal pressure sensors located in the backrest cushion of the front seat 56 of vehicle 64. The reference numerals 59 and 60 denote fixed signal pressure sensors located in the passenger side of the seat cushion of the front seat 56 of vehicle 64. The reference numeral 61 denotes the authorized operator variable signal pressure sensor, referring to FIG. 5, located in the seat cushion of the operator's seat 56 of the vehicle 64. This sensor 61 responds to the seat pressure that the operator exerts on the operator's seat. The advantage here is that is unlikely that different operators will have the same voltage signal identification. This allows the command control 7 to identify the authorized occupant by monitoring the output signal 45 of the pressure sensor module 48. The command control unit 7 continuously monitors the vehicle 64 sensors 21 automatically. The pressure transducer 43 can be easily modified to fit almost any application including the present invention. Referring to FIG. 4, the pressure sensor 42 comprises a low cost capacitive type versatile pressure transducer 43 which is an electrical pressure transducer which is operatively connected to a pressure sensing pad 44 or other sensing apparatus to transmit the pressure signal to the pressure transducer 43 via rubber or plastic tubing. The pressure transducer contains a sensor module 48 providing an output signal 45 indicative of fluid pressure effective thereon to the command control unit 7 which also sends an input signal 46 to the pressure sensor 42 pressure transducer 43 as well as a ground connection at 47. The flexible plastic or rubber sensing pad 44 and plastic or rubber tubing are readily available on the market. A well known manufacturer and supplier of such products is B.F. Goodrich of Akron, Ohio. Although a specific manufacturer and materials for the flexible liquid filled sensing pad 44 have been disclosed there are other well known manufacturers and materials which may be used. A liquid filled pressure sensing pad 44 is operatively connected to a pressure transducer 43. Although FIG. 4 shows the components separately the pressure transducer and pressure sensing pad may be an integral unit. The command control unit 7 is operatively connected to the pressure transducer 43. The pressure sensing pad 44 contains a liquid that has the properties of any well known ethylene glycol based solution. One such solution is Peak Antifreeze and Coolant manufactured by Old World Industries Inc., Northbrook, Ill. Although a specific solution has been disclosed it is well understood that numerous other liquid solutions may be used as well. The pressure transducer 43 accordingly reacts quickly to changes in the amount of pressure applied to the pressure sensing pad 44 as the authorized operator or occupant occupies a pressure sensor 42 monitored seat in the vehicle 64. When a seat is occupied the liquid pressure sensing pad 44 senses the pressure of the occupant as they occupy the seat surface (not shown) this results in a change in pressure of the liquid inside the pressure sensing pad 44. This change in pressure is received by the pressure transducer 43 which transmits an output signal 45 of the sensor 42 which is monitored by the command control unit 7. The output signal 45 is analyzed as a report of an occupied seat. The sensor 42 monitors the input pressure signal 49 while the seat is occupied. These input pressure signals 49 are analyzed and compared with those stored in the memory of the command control unit 7. The output signal 45 of the sensor 42 therefore will vary depending on the input pressure signal 49 which is relative to how much pressure is applied to the pressure sensing pad 44. When the seat is vacated the pressure transducer furnishes a constant output signal 45 for example a 0-value. This output signal 45 is recognized by the command control unit 7 as an unoccupied seat. Intentional or unintentional movements of the seated occupant(s) on the pressure sensing pad 44 are recognized by the command control unit 7 and would not interfere with the normal system operation. A transducer performing this function is the model number P155 manufactured by Kavlico Corporation, Moorpark, Calif. Although a specific pressure transducer has been disclosed, it is well understood that numerous other pressure transducers can be used to convert the input pressure signal 49 into an output electrical signal 45 to the command control unit 7.

A pressure switch (not shown) may be used to turn on the command control unit 7 when the ignition is not on. This prevents unecessary voltage drain on the system battery 8 and the vehicle battery 9. Thus, when the ignition is not on the pressure activated switch (not shown) will provide battery power to the command control unit 7 when any monitored seat in the vehicle is occupied. The pressure switch (not shown) may be seperate or incorporated into the pressure sensor 42.

The output signal 45 of the authorized occupant is stored in the memory of the command control unit 7 and is constantly compared with the output signal 45 of the pressure sensor 42. Any unprogrammed or unauthorized signals will activate the disablement sequence at 33 in FIG. 3. This sensor 42 allows an authorized occupant to easily operate the system 20 while making it virtually impossible for an unauthorized occupant to operate the vehicle 64. The authorized occupant can, after programming the command control unit 7 operate the vehicle 64 without the need for transmitters, buttons or switches or other manual devices to operate its carjacking functions.

The command control unit 7 receives inputs from ignition sensor 2, pressure sensors 1, shift lever position sensor 4, engine rpm sensor 3 and auxiliary sensors 5, as well as, a determination of a connection to vehicle 64 battery 9 and command control unit 7 battery 8. The command control unit processes these inputs and if necessary, controls system 20 devices, 15, 16, 17, 18, 19 by controlling corresponding relays 10, 11 12, 13 and 14 located in strategic locations in vehicle 64. Command control unit 7 circuitry includes any suitable microprocessor, for example, an Intel microcontroller chip such as, 8031 or 8096, or a Motorola microcontroller chip such as a 68332 together with appropriate memory and interfacing.

Relays 22 are normally open and their operation are described below in conjunction with the operational flow charts shown in FIGS. 2 AND 3. Other well-known signal conditioning circuitry can be used between command control unit 7 and the system devices 23, including but not limited to, power resistors, as well as appropriate isolation circuitry such as capacitive filters etc.

Figure 2:
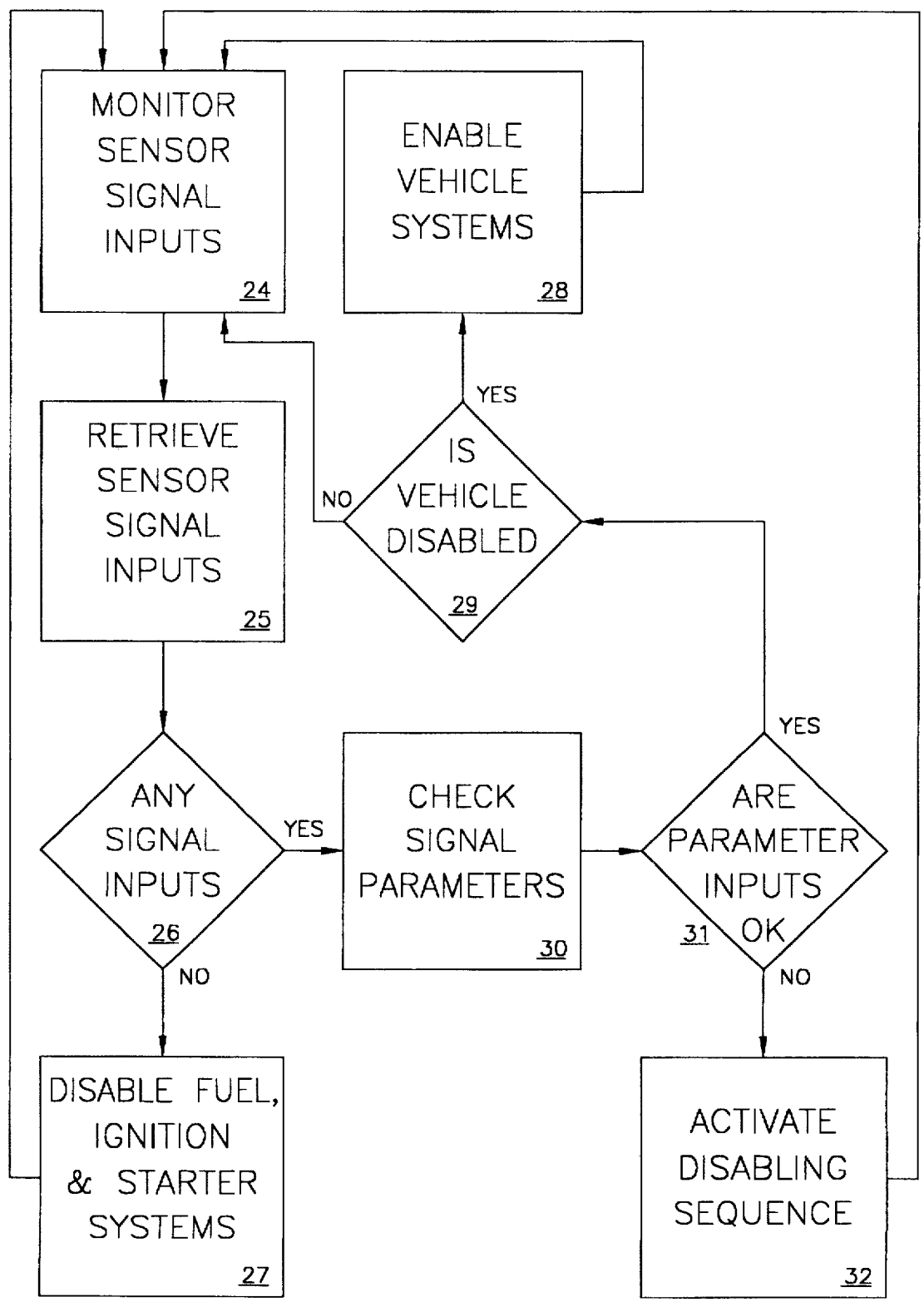
FIG. 2 Is a flow diagram illustrating the operation of a automatic occupant sensing anti-carjacking system according to the present invention.

Command control unit 7 is designed to operate the automatic occupant sensing anti-carjacking system 20 as shown by the flow chart of FIG. 2 to provide automatically operated anti-carjacking protection. To a vehicle 64 operator desiring automatically operable anti-carjacking protection in any carjacking scenario. This system offers anti-carjacking protection regardless whether the authorized occupant is inside or outside of the vehicle 64, regardless whether the ignition is on or off in vehicle 64, regardless whether the engine is running or not running in the vehicle 64, regardless whether the vehicle 64 is attended or unattended, regardless whether the carjacker attempts to take the authorized occupant hostage and force the authorized occupant to drive the vehicle 64, regardless whether the carjacker attempts to take the authorized occupant hostage by forcing the authorized occupant into the trunk of the vehicle 64 and other likely scenarios.

Other than the programming of the command control unit 7 there are no manually operated buttons or switches needed to activate carjacking protection functions. The authorized occupant need not be concerned with turning it on or off as it works automatically requiring no further authorized occupant activation. Appropriate indicators such as a chirp speaker or LED indicators may be used to indicate system 20 status to the authorized occupant.

The command control unit 7 retrieves the stored input, at 25 in FIG. 2, from the array of sensors 21. The command control unit 7 then begins to compare all signal inputs, at 30 in FIG. 2, with those stored in the memory of the command control unit 7. If any signals are not within programmed parameters the command control unit 7 activates the anti-carjacking disabling sequence at 33 in FIG. 3 automatically.

Figure 3:
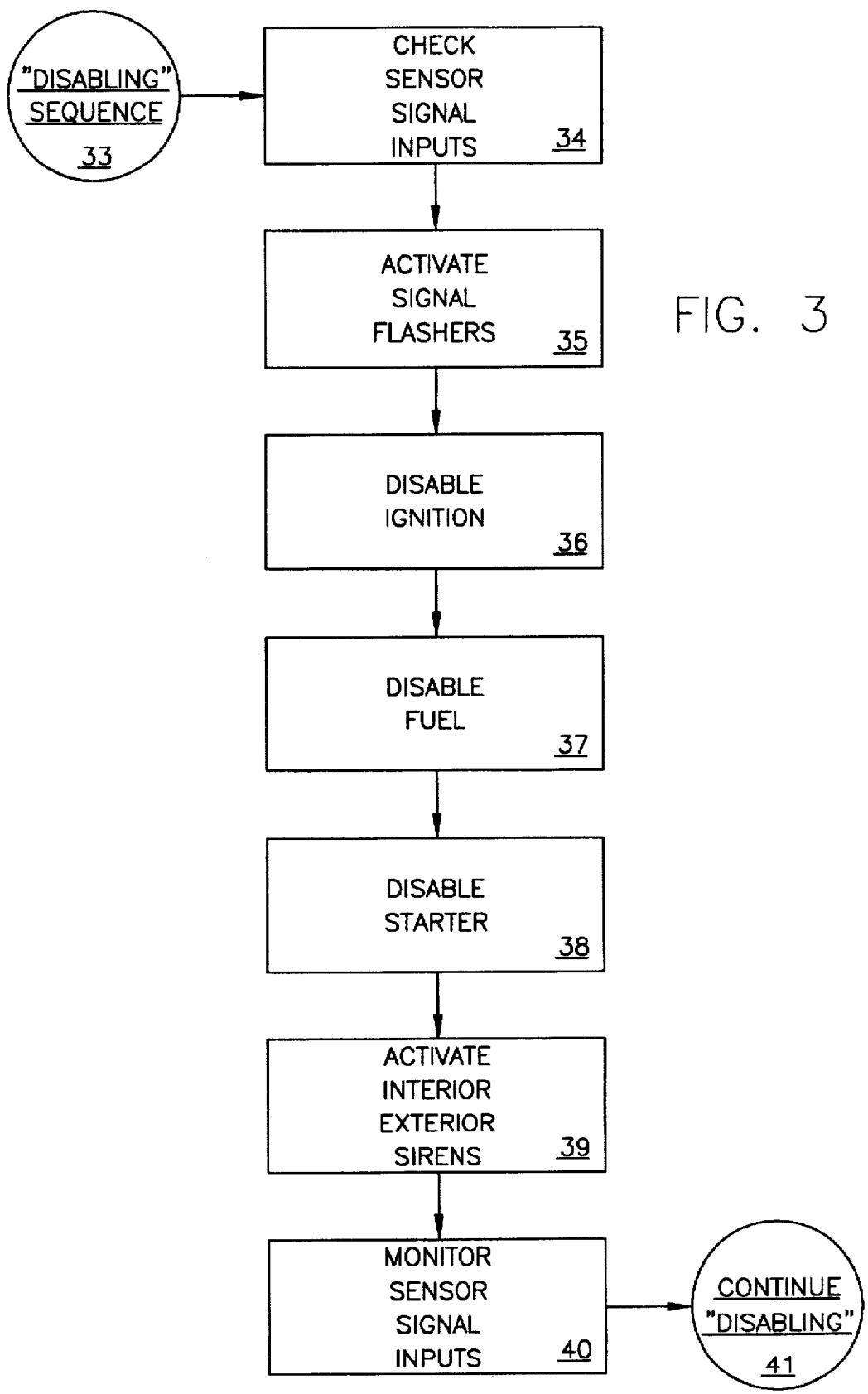
FIG. 3 Is a flow diagram illustrating the operation of the disablement sequence of the command control unit.

During the disablement sequence the command control continues to check sensor inputs at 34, the hazard lights 18 at FIG. 1, flash continuously for a pre-determined amount of time at 35 in FIG. 3, before engine disablement at 36, 37 and 38 to allow the operator time to safely drive the car out of traffic prior to engine disablement, at 36, 37 and 38, by the command control unit 7. At the expiration of this pre-determined time the hazard lights 18 will continue to flash and the audible devices 19, in FIG. 1, will begin to sound at 39 after disablement at 36, 37 and 38. Audible devices included for use in the anti-carjacking disablement sequence are interior and exterior audible devices 19. There are numerous types of well known sirens, speakers, and horns which may be used for this purpose. The command control unit 7 includes a timing device for controlling both audible devices 19 and hazard flashers 18 so that they operate for a maximum time period and then automatically shut off. Unless enabled by an authorized operator the engine will remain disabled at 36, 37 and 38 and the hazard flasher 18 and audible devices 19, referring to FIG. 1, will stop after 15 minutes or other pre-determined amount of time. The system 20 will continue to monitor sensors 21 at 40 and continue disabling at 41 until the appropriate input parameters are received by the command control unit 7. If there are no input signals the command control unit 7 will automatically disable vehicle 64 at 27 in FIG. 2.

For increased anti-carjacking protections the command control unit 7 checks for disablement status at 29, in FIG. 2, the engine can only be enabled, at 28, once disabled, at 36, 37 and 38 in FIG. 3, by an authorized occupant sitting and occupying the operator's seat 56, in FIG. 5, of the vehicle 64 where pressure sensor 61 will send a signal to the command control unit 7 that there is an authorized occupant in the vehicle 64. The command control unit 7 will then enable the vehicle's 64 engines at 29 in FIG. 2, and deactivate hazard lights 18 and deactivate audible devices at 19 and return the system 20 to monitor mode at 24. The vehicle 64 can also be enabled by an authorized operator using the reset and override functions of the monitor-keypad 6. A carjacker would not be able to prevent disablement at 36, 37 and 38 as the array of sensors 21 would signal the command control unit 7 of an unauthorized occupancy. The command control unit 7 monitors the system 20 at 24, it then retrieves the signal at 25, identifies the signal at 26, checks the parameters of the signals at 30 and since the carjackers signal would be identified as unauthorized at 31 the command control unit 7 would activate the disabling sequence at 32.

Another method the thief may attempt is to disconnect the vehicle 64 battery 9 and the system 20 battery 8 in an attempt to enable the system 20. Since all relays 22 in the system 20 are normally open and must be energized by the command control unit 7 disconnection of the batteries at 8 and 9 will only serve to put the system 20 in the disablement mode at 27 in FIG. 2.

It is important that the anti-carjacking prevention features be automatically initiated, Prior art devices which utilize remote transmitters and hidden switches are not reliable as the carjacker may force coerce the operator to give up the transmitter, the operator may forget to carry the transmitter, the operator may be coerced prior to entering or shortly after exiting their vehicles the operator may be injured by the carjacker and be unable to use the transmitter or activate any hidden switches. Also prior art devices using remote transmitters only protect the vehicle from carjacking while the engine is running and the operator is in the vehicle. They offer no protection if the operator fails to activate the transmitter, forgets the transmitter, the vehicle exceeds transmitter signal range prior to the operation of the transmitter signal or the carjacker obtains the transmitter.

The present invention as herein described makes it virtually impossible for an carjacker to obtain the vehicle 64 during an attempted carjacking in any scenario.

To illustrate the capabilities of the present invention, several scenarios are described below which demonstrates the unequalled protection afforded by the automatic occupant sensing anti-carjacking system 20 of the present invention:

Assume the operator drives vehicle 64 to the grocery market and turns the engine off and leaves the vehicle unoccupied. The array of sensors 21 will send signals to the command control unit 7 that the vehicle 64 is unoccupied. The command control unit will then automatically initiate ignition, fuel and starter disablement at 27 in FIG. 2, until enabled by an authorized occupant. The authorized operator returns to vehicle 64 and occupies the operator's seat 56 the array of sensors 21 will send a signal to the command control unit 7 that an authorized occupant is in the vehicle 64 and the command control unit 7 will automatically enable at 28 the vehicle 64 systems 23. Additionally, if an unauthorized operator enters the unoccupied vehicle 64 the array of sensors 21 will send signals to the command control unit 7 that an unauthorized occupant is in the vehicle 64. The command control unit 7 will then automatically initiate the anti-carjacking disablement sequence at 33 in FIG. 3. In another scenario, the authorized operator is stopped waiting for a traffic light to change when a carjacker appearing at the window points a gun at the authorized operator and demanding the vehicle 64. To end this scenario and the possibility of injury, the authorized operator merely complies with the carjacker's demands knowing that the vehicle 64 will not get more than a pre-determined amount of time away, for example 60 seconds. The pressure sensor 61, in FIG. 5 sends a signal to the command control unit 7 that an unauthorized operator has entered vehicle 64. The command control unit 7 will than automatically initiate the anti-carjacking disablement sequence at 33 in FIG. 3. Additionally, the vehicle 64 hazard lights 18 will flash continuously, at 35 notifying the authorized operator that the anti-carjacking disablement sequence has begun and the carjacking attempt will be foiled. At a pre-determined time after the hazard lights 18 began flashing, at 35, for example, 60 seconds later the carjacker will then decide to abandon the carjacking, compelled by the painful sound of the interior audible device at 39 in FIG. 3. It is likely that the carjacker will be observed as vehicle 64 is abandoned because the sound of exterior audible device at 39, in FIG. 3, draws the attention of onlookers or passerbys or others at the scene.

In yet another scenario, an operator is approaching their car in a parking lot or pumping gas at a gas station, when a carjacker demands the car threatening the operator with a gun. The operator wisely turns over the keys and lets the carjacker occupy the operator's seat at 56 in the vehicle 64. At this times the occupancy sensor at 61, in FIG. 5, will send a signal to the command control unit 7 that an unauthorized occupant is in the vehicle 64. The command control unit 7 will then automatically initiate the anti-carjacking sequence at 32 in FIG. 2 and the hazard lights at 18 will began to flash continuously at 35 notifying the operator the carjacking attempt will be foiled in the same manner as described above.

In a different scenario, the operator is stopped waiting for a traffic light to change when a carjacker forces his way by gunpoint into the passenger seat of the vehicle 64 and demands that the operator drive the vehicle or forces the operator into the trunk of the vehicle 64 the operator merely complies with the carjackers demand knowing that the vehicle 64 will be disabled at 32, in FIG. 2, as the pressure sensors at 57, 61, and 63 in FIG. 5 send a signal to the command control unit 7 that an unauthorized occupant has entered the vehicle 64. The command control unit 7 will then automatically initiate the anti-carjacking disabling sequence at 33 in FIG. 3. At this time the hazard lights 18 will begin to flash at 35, in FIG. 3, and after a pre-determined amount of time, for example, 60 seconds the vehicle 64 will be disabled at 36, 37 and 38 and audible devices 19 will sound at 39 compelling the carjacker from the vehicle 64.

Still another scenario is where the vehicle 64 is occupied by two authorized occupants. One at sensor 59 and one at sensor 61. Both sensors 59 and 61, in FIG. 5, are of the pressure sensor type illustrated in FIG. 4. Both sensors 59 and 61 are programmed into the memory of the command control unit 7. The authorized occupants stop at a late night party store at 1:30 a.m. The occupant at 59 exits the vehicle 64 to go into the party store. Leaving the occupant at 61 in the vehicle. pressure sensor 60 is set to sense an unauthorized occupancy. While the authorized occupant at pressure sensor 59 is in the party store an unauthorized occupant enters the vehicle 64 at sensors 59 and 60 and attempts to make the occupant at sensor 61 drive the vehicle at gunpoint. Within seconds after the unauthorized occupant enter the vehicle 64 the pressure sensors at 59 and 60 send signals to the command control unit 7 that an unauthorized occupant is in the vehicle 64. The command control unit 7 automatically initiates the disabling sequence, at 33 in FIG. 3, which prevents the vehicle 64 from leaving the scene and prevents a possible hostage scenario where the authorized occupant may have been forced to drive their own vehicle to some isolated location where the carjacker may do harm to an authorized occupant and go unnoticed.

In yet another scenario, a carjacker watches and stalks a potential victim leave their vehicle 64 and go into the supermarket to shop. As the potential victim returns to and is sitting in their vehicle. The carjacker approaches the vehicle preparing to attempt the carjacking. As the carjacker approaches the vehicle he notices an emblem obviously displaying the fact the vehicle 64 is equipped with the present invention. The carjacker realizing that he will not be able to drive away with vehicle 64 aborts his attempt and seeks another vehicle not so equipped.

Finally, referring to FIG. 1, the command control unit 7 responds to sensor inputs by controlling actuators or relays 22 according to programmed instructions. The sensors 21 provide input to the command control unit 7 about vehicle occupancy, engine and vehicle conditions and the command control unit 7 initiates the appropriate response. By way of example, if the ignition sensor 2 indicates that the ignition is on and the shift lever position sensor 4 indicates a parked condition, the pressure sensors 1 indicate a no occupancy condition and the RPM sensor 3 indicates the engine is running the command control unit 7 will allow an authorized operator to idle the engine for purposes of warming the engine in necessary weather conditions. The authorized operator need not be in the vehicle 64 for the engine to idle. Upon initial startup the pressure sensor 61, in FIG. 5, sends a signal to the command control unit 7 that an authorized occupant is in the vehicle. Thus, after startup the authorized occupant may exit the vehicle 64 and the vehicle 64 will continue to idle. However, if the carjacker attempts to enter the vehicle while it is idling and the authorized occupant is not in the vehicle the pressure sensor 61 will send a signal to the command control unit 7 that an unauthorized occupant is in the vehicle 64 and will automatically initiate the disablement sequence at 33 in FIG. 3.

Thus it will be demonstrated that there is a vehicular automatic occupant sensing anti-carjacking system which achieves the various objectives, features and considerations of the present invention and which is well adapted to meet the conditions of mass production and practical usage.

As various changes might be made in the exemplary embodiments above described and shown without departing from the spirit of the invention and as various changes might be made in the embodiment set forth, it is to be understood that all matter herein described or shown in the accompanying drawings is to be interpreted as illustrative and not in a limiting sense. The spirit and scope of the present invention are to be limited only by the terms of the appended claims.

Having thus described the present invention, there is claimed as new and desired to be secured by Letters Patent:

1. A method for preventing carjacking and protecting the authorized occupant of the vehicle from being taken hostage in their own vehicle and facilitating the recovery of a vehicle from an unauthorized occupant who attempts or has obtained possession of the vehicle by carjacking the vehicle from the authorized occupant by force in any of various carjacking scenarios, the method comprising the steps of:

(a) detecting that the authorized operator occupant is in the vehicle monitoring the status of wired communication signals transmitted by array of sensors;

(b) detecting that the authorized operator occupant is not in the vehicle by monitoring the status of wired communication signals transmitted by array of sensors;

(c) detecting that other authorized occupants are in the vehicle by monitoring the status of wired communication signals transmitted by array of sensors;

(d) detecting that other unauthorized occupants are in the vehicle by monitoring the status of wired communication signals transmitted by array of sensors;

(e) detecting a carjacking condition indicating that the authorized occupant is no longer in the vehicle by monitoring the status of wired communication signals transmitted by array of sensors;

(f) detecting a carjacking condition indicating a hostage condition where the unauthorized occupant is in the vehicle with the authorized operator occupant by monitoring the status of wired communication signals transmitted by array of sensors;

(g) disabling the vehicle.

2. A method for preventing carjacking and to provide preventive protection to the authorized occupant of the vehicle from being taken hostage in their own vehicle and facilitating the recovery of a vehicle from an unauthorized occupant who attempts or has obtained possession of the vehicle by carjacking the vehicle from the authorized occupant by force in any of various carjacking scenarios, in accordance with claim 1 further comprising the steps of:

(h) Compelling the unauthorized occupant to exit the vehicle by using audible indication means, interior of the vehicle, responsive to the determination means for providing an audible indication that a carjacking condition has occurred;

(i) Draw attention to the disabled vehicle and the unauthorized occupant by using audible indication means, exterior of the vehicle, responsive to the determination means for providing an audible indication that a carjacking condition has occurred;

(j) continuously monitor the status of the array of sensors by monitoring the status of wired communication signals transmitted by the array of sensors.

* * * * *